United States Patent
Boigues

(10) Patent No.: US 6,529,358 B1
(45) Date of Patent: *Mar. 4, 2003

(54) DRIVER PROTECTION CIRCUIT FOR PREVENTING DAMAGE DUE TO LINE CONTACT WITH GROUND OR SUPPLY VOLTAGE

(75) Inventor: Norbert Boigues, Rambouillet (FR)

(73) Assignee: Siemens VDO Automotive AG, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,791
(22) PCT Filed: Mar. 4, 1999
(86) PCT No.: PCT/EP99/01393
§ 371 (c)(1), (2), (4) Date: Mar. 27, 2000
(87) PCT Pub. No.: WO99/46842
PCT Pub. Date: Sep. 16, 1999

(30) Foreign Application Priority Data

Mar. 10, 1998 (FR) .............................. 98 02909
Mar. 13, 1998 (FR) .............................. 98 03140

(51) Int. Cl.$^7$ ................................. H02H 3/00
(52) U.S. Cl. .................... 361/93.1; 361/58; 361/96; 361/101
(58) Field of Search .................... 361/58, 98, 101, 361/87, 92, 93.1, 93.9, 96; 345/208–214, 87–104; 330/207 P, 285, 295; 307/10.1, 10.7, 9.1; 327/108, 408; 326/82, 86, 89–91

(56) References Cited

U.S. PATENT DOCUMENTS

| | | | |
|---|---|---|---|
| 3,668,545 A | * | 6/1972 | Von Recklinghausen 330/207 P |
| 4,504,895 A | * | 3/1985 | Steigerwald .................. 363/17 |

FOREIGN PATENT DOCUMENTS

| | | | |
|---|---|---|---|
| DE | 12 92 723 | 4/1969 | |
| DE | 1 764 713 | 10/1971 | |
| DE | 28 12 157 A | 9/1979 | ............ H04L/25/08 |
| EP | 0 505 602 A | 9/1992 | ............ G05F/1/571 |
| FR | 2 652 687 A | 4/1991 | ............ H02H/9/02 |
| FR | 2 654 874 A | 5/1991 | ............ H02H/9/02 |

* cited by examiner

*Primary Examiner*—Stephen W. Jackson
(74) *Attorney, Agent, or Firm*—Mayer, Brown, Rowe & Maw

(57) ABSTRACT

This circuit is inserted between a terminal (RGB) and a line (LI). The signal of the input terminal (RGB) is applied to the base of a bipolar amplifier transistor (T2) mounted with a top load (LR1) and a bottom load (LR2). A series transistor (T1) mounted in series in the main signal path has its collector wired up as an electrode for receiving the input signal, its emitter feeds a line (LI), and its base is linked by a resistor to the collector of the second transistor.

7 Claims, 2 Drawing Sheets

DRIVER PROTECTION CIRCUIT FOR PREVENTING DAMAGE DUE TO LINE CONTACT WITH GROUND OR SUPPLY VOLTAGE

BACKGROUND OF THE INVENTION

1. Field of the Invention

The present invention relates to a protection circuit to be inserted into an analog signals transmission line, circuit furnished with a supply terminal, an earth terminal, an input terminal and an output terminal, circuit comprising a first so-called series transistor, a current-receiving electrode of which is linked to a terminal to which is applied a voltage substantially equal to the voltage of the input terminal whilst a current-delivery electrode of this transistor feeds an output terminal, and a second transistor for controlling the first.

2. Description of the Related Art

A protection circuit is known from the document DE-OS-28 12 157. According to this document, a switching transistor inserted into a line is associated with an auxiliary transistor switched on by a signal at the terminals of a resistor for measuring the current, which adds current into the base of the switching transistor.

An object of the invention is to make the circuit still more efficient.

SUMMARY OF THE INVENTION

For this purpose, the second transistor is mounted as an amplifier, with a current-receiving electrode loaded by a so-called top load element linked to the supply terminal, a current-delivery electrode loaded by a so-called bottom load element linked to earth, and a control electrode wired up in such a way that the voltage of the input terminal is substantially applied thereto, whilst a control electrode of the series transistor is linked to the second transistor on the top load element side.

Particular modes of implementation of the invention appear in the dependent claims 2 to 6.

BRIEF DESCRIPTION OF THE DRAWINGS

These aspects of the invention as well as other more detailed aspects will be more clearly apparent by virtue of the following description of an embodiment constituting a non-limiting example.

DETAIL DESCRIPTION OF THE PRESENTLY PREFERRED EMBODIMENTS

Figure 1:
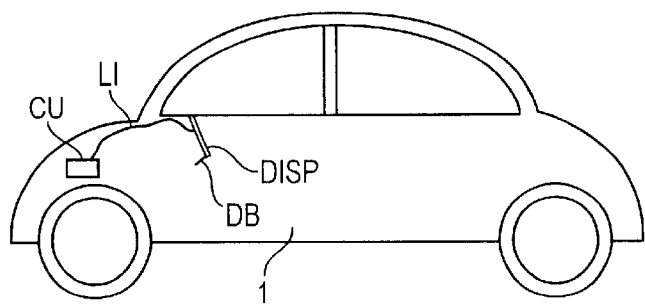
FIG. 1 represents a road vehicle.

The vehicle 1 of FIG. 1 is furnished with a central unit which generates an analog signal and with a line for transmitting this signal which culminates at a peripheral unit incorporated in the dashboard DB of the vehicle. The central unit CU is for example the computer of a navigation apparatus which yields color component signals RGB for a display, the line is for example a shielded bipolar line LI (one per color), and the peripheral unit is for example a liquid crystal display DISP.

Figure 2:
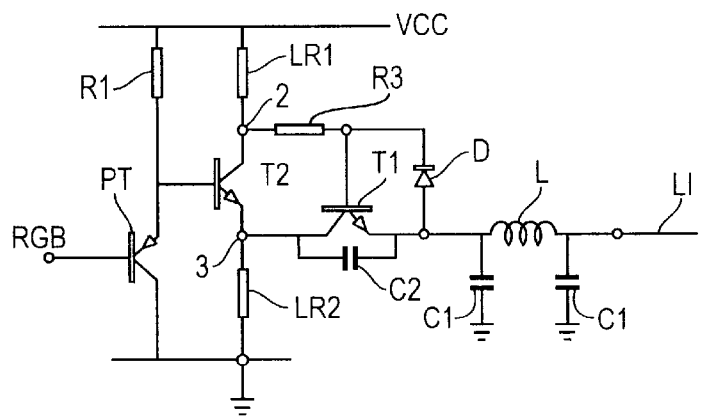
FIG. 2 is a diagram of an embodiment of the circuit, designed to be placed between an analog signal generator and a line for transmitting this signal.

The circuit of FIG. 2 is supplied by a voltage VCC of for example 12 volts. It comprises an RGB input terminal, to which the computer CU delivers a signal, and an output terminal linked to the line LI. A first so-called series transistor T1, of NPN type, is placed in such a way that its main current path (going from the collector to the emitter) links the input terminal to the output terminal via various elements which will be described later.

The signal of the input terminal is applied to a preamplifier stage known per se, consisting of a transistor PT mounted in follower mode together with a load resistor R1. The signal from the preamplifier stage PT is applied to the control electrode, namely the base, of a second transistor T2, of the same conduction type as the series transistor, mounted also as a conventional amplifier with a current-receiving electrode, namely the collector, loaded by a so-called top load element, namely the resistor LR1 linked to the supply terminal, and a current-delivery electrode, namely the emitter, loaded by a so-called bottom load element, namely the resistor LR2, linked to earth.

The first transistor T1 possesses a current-receiving electrode, namely its collector, wired up to the emitter of the second transistor T2, that is to say on the bottom load element LR2 side. The current-receiving electrode of T1 is thus linked to the terminal 3 to which is applied a voltage substantially equal to the voltage of the input terminal. A current-delivery electrode, namely its emitter, feeds the line LI, and a control electrode, namely its base, is linked by a resistor R3 to the collector of the transistor T2, that is to say on the top load element side. The main current in T1 is delivered from VCC via the resistor LR1. If for example the line LI were short-circuited with earth, an excessive current in LR1 would cause the voltage at the point 2 to drop, together with the base voltage of T1, thus limiting the current delivered to the line.

A diode D is wired up between the line LI and the base of the first transistor T1, with its cathode linked to the base of T1, hence in a sense such that it is disabled in normal service. It would have a disabling effect if the line LI were accidentally to come into contact with the 12-volt supply. A small model is sufficient since a heavy current never passes therethrough, owing to the fact that it is in series with R3. The main current path of the first transistor T1 is shunted by a capacitor C2 between its collector and its emitter, so as to short-circuit the dynamic resistance of this transistor. A low-pass filter consisting of an inductor L in series, and of two capacitors C1 in parallel is inserted in the current path going from the input terminal to the output terminal.

An exemplary embodiment employs the following values: R1=470 ohms, LR1 and LR2=33 ohms, R3=4700 ohms, C1=1 nF, L=1 $\mu$H, D=1N4148.

Figure 3:
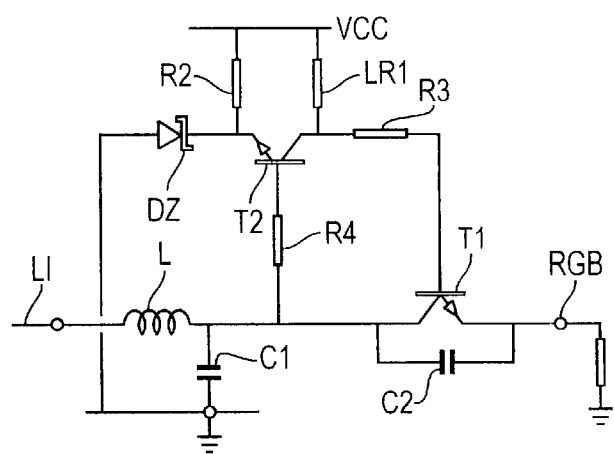
FIG. 3 is a diagram of an embodiment of the circuit, designed to be placed between a line for transmitting a signal and an apparatus.

The circuit of FIG. 3 is supplied by a supply VCC, of 12 volts for example. It is furnished with an input terminal linked to the line LI and with an output terminal RGB, which is for example an input terminal of an apparatus.

The main current path of a first so-called series transistor T1, of NPN type, links the input terminal of the circuit to its output terminal. The voltage on the input terminal (LI) is applied via a resistor R4 to the control electrode, namely the base, of a second transistor T2 of NPN type, mounted as a comparator between a reference voltage developed at the terminals of a so-called bottom load and applied to its emitter, and the voltage of its base. The bottom load is a Zener diode DZ, for example a 5-volt model, linked to earth and through which a resistor R2 causes a current from the supply VCC to pass. The collector of the transistor T2 is linked to the supply VCC by a so-called top load LR1. The base of the series transistor T1 is linked to the collector of T2 by a resistor R3; it could also be linked to it directly.

The input of the setup comprises a low-pass filter consisting of an inductor L in series and of a capacitor C1 in parallel. This filter ensures protection against electromagnetic interference. The main current path of the transistor T1 is shunted by a capacitor C2, so as to short-circuit the dynamic resistance of this transistor. The values of the elements may be determined from those of the corresponding elements of the setup of FIG. 2.

If the line LI is accidentally short-circuited with earth, the transistor T2 is disabled, and a current passes only through the line via the forward-biased base-collector junction of the transistor T1; this current is limited by the resistor LR1 and possibly by R3.

If the line LI is accidentally short-circuited with the supply VCC, this saturates the transistor T2, thereby maintaining its collector voltage very close to the 5-volt Zener voltage, thus limiting the voltage on the load LR2 to around 5 volts.

The Zener diode DZ could be replaced by a simple resistor for the sake of simplicity; the reference voltage would be less well defined but the setup would remain efficient.

Figure 4:
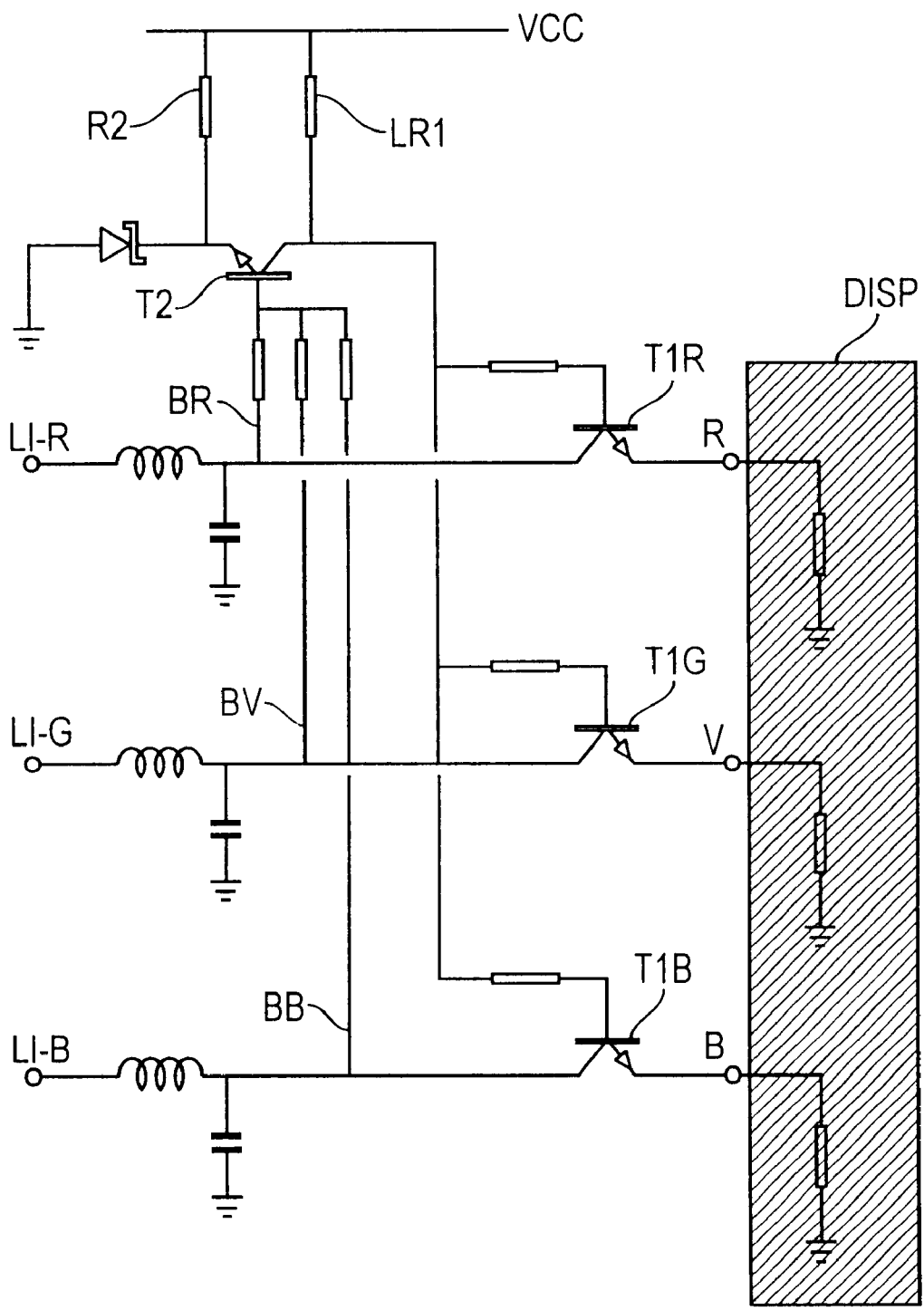
FIG. 4 is a diagram of a variant of use of the circuit of FIG. 3.

The protection circuit of FIG. 4 is placed between several signal transmission lines, namely three lines LI-R, LI-G, LI-B, and several inputs, for example three color signal inputs R, G, B, of the liquid crystal display DISP. The circuit comprises several first transistors T1R, T1G, T1B, whose control electrodes (bases) are linked on each occasion by a resistor to the output of the second transistor T2, that is to say to its collector. The control electrode (base) of the second transistor T2 is linked to the lines by three star-configured branches BR, BG, BB, each comprising a resistor.

The bipolar transistors could possibly be replaced by field-effect transistors. In this case, the control electrode would be referred to as the gate, the current-receiving electrode as the drain, and the current-delivery electrode as the source.

KEY TO FIGURES

FIGS. 2 and 3:
RVB→RGB
FIG. 4:
BV→BG
T1V→T1G
V→G

What is claimed is:
1. A protection circuit comprising:
a supply terminal, an earth terminal, an input terminal which receives a voltage signal and an output terminal;
a first series transistor,
a current-receiving electrode of which is linked to a node which receives a voltage substantially equal to the voltage of the input terminal;
a current-delivery electrode of the first series transistor coupled to the output terminal, and a second transistor for controlling the first series transistor;
wherein the second transistor is an amplifier, with a current-receiving electrode loaded by a top load element linked to the supply terminal, a current-delivery electrode loaded by a bottom load element linked to the earth terminal, and a control electrode receiving a voltage that is substantially equal to the voltage of the input terminal; and
a control electrode of the first series transistor linked to the second transistor on the top load element side, wherein the first series transistor conducts current between its current delivery electrode and current receiving electrode unless the voltage from its control electrode drops from excessive current from the output terminal.

2. The protection circuit as claimed in claim 1, connected between an analog signal generator and a signal line for transmitting this signal, wherein the electrode of the second transistor which is loaded by the bottom load is linked to the output terminal via the series transistor.

3. The protection circuit as claimed in claim 2, wherein a diode is wired up between the line and the control electrode of the series transistor, biased such that it is normally disabled.

4. The protection circuit as claimed in claim 1, placed between a line for transmitting an analog signal and an apparatus, wherein the bottom load element is a Zener diode or a resistor bridge between the supply terminal and earth.

5. The protection circuit as claimed in claim 4, placed between several transmission lines and the apparatus, and further comprising several input terminals, the control electrode of the first transistor being linked to the input terminals by several branches, and several second transistors each linked to an output terminal.

6. The protection circuit as claimed in claim 1, wherein a main current path of the series transistor is shunted by a capacitor.

7. A protection circuit comprising:
a supply terminal, an earth terminal, an input terminal which receives a voltage signal and an output terminal;
a first series transistor,
a current-receiving electrode coupled to the input terminal;
a current-delivery electrode of the first series transistor coupled to the output terminal, and a second transistor for controlling the first series transistor;
wherein the second transistor is an amplifier, with a current-receiving electrode loaded by a top load element linked to the supply terminal, a current-delivery electrode, and a control electrode receiving a voltage that is substantially equal to the voltage of the input terminal; and
a control electrode of the first series transistor linked to the second transistor on the top load element side, wherein the first series transistor conducts current between its current delivery electrode and current receiving electrode unless the voltage from its control electrode drops from excessive current from the output terminal.

* * * * *